United States Patent
Miyata

(10) Patent No.: US 10,080,183 B2
(45) Date of Patent: Sep. 18, 2018

(54) INFORMATION PROCESSING DEVICE, CONNECTION CONTROLLING METHOD AND NON-TRANSITORY COMPUTER READABLE MEDIUM STORING PROGRAM

(71) Applicant: FUJI XEROX CO., LTD., Tokyo (JP)

(72) Inventor: Shigeo Miyata, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 173 days.

(21) Appl. No.: 14/937,963

(22) Filed: Nov. 11, 2015

(65) Prior Publication Data
US 2016/0345252 A1 Nov. 24, 2016

(30) Foreign Application Priority Data
May 21, 2015 (JP) .................. 2015-103805

(51) Int. Cl.
| | | |
|---|---|---|
| *H04W 4/00* | (2018.01) | |
| *H04W 48/16* | (2009.01) | |
| *H04W 76/14* | (2018.01) | |
| *H04W 84/12* | (2009.01) | |
| *H04W 48/20* | (2009.01) | |

(52) U.S. Cl.
CPC ........... *H04W 48/16* (2013.01); *H04W 76/14* (2018.02); *H04W 48/20* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2012/0106514 A1* | 5/2012 | Zheng | ................... | H04W 36/32 370/331 |
| 2014/0334438 A1* | 11/2014 | Cohen-Arazi | .... | H04W 36/0077 370/331 |
| 2015/0078360 A1* | 3/2015 | Wang | ................... | H04W 48/18 370/338 |
| 2015/0195773 A1* | 7/2015 | Weng | ....................... | G01S 5/02 370/328 |

(Continued)

FOREIGN PATENT DOCUMENTS

JP 2013-161250 A 8/2013

*Primary Examiner* — Otis L Thompson, Jr.
(74) *Attorney, Agent, or Firm* — Sughrue Mion, PLLC

(57) ABSTRACT

An information processing device includes: a communication controller that is able to connect to plural wireless LANs; a setting information management unit that, when connection is made to an operation target device via a wireless LAN, manages setting information including information of a first wireless LAN, which is a wireless LAN as a connection destination, and information of the operation target device; a communication switching unit that, in a case where the operation target device does not exist on a second wireless LAN, which is a wireless LAN currently connected by the communication controller, switches the wireless LAN as the connection destination to the first wireless LAN based on the setting information; and an operation unit that searches for the operation target device on the first wireless LAN to which the communication switching unit has switched the wireless LAN, and if the operation target device exists, connects to the operation target device to operate thereof.

13 Claims, 6 Drawing Sheets

(56) References Cited

U.S. PATENT DOCUMENTS

2015/0268903 A1* 9/2015 Baba .................... G06F 3/1236
  358/1.15
2015/0378659 A1* 12/2015 Asai .................... G06F 3/1292
  358/1.15

* cited by examiner

INFORMATION PROCESSING DEVICE, CONNECTION CONTROLLING METHOD AND NON-TRANSITORY COMPUTER READABLE MEDIUM STORING PROGRAM

CROSS REFERENCE TO RELATED APPLICATION

This application is based on and claims priority under 35 USC § 119 from Japanese Patent Application No. 2015-103805 filed May 21, 2015.

BACKGROUND

Technical Field

The present invention relates to an information processing device, a connection controlling method and a non-transitory computer readable medium storing a program.

Related Art

Connection between information appliances that handle digital information via a LAN (Local Area Network) using wireless communication (hereinafter, referred to as wireless LAN) and transmission and reception of data are carried out. Many of portable information appliances, such as smartphones or tablet-type information terminals, include a data transmission and reception function by the wireless LAN. Moreover, it is also carried out that an operation target device, such as a printing machine (a printer), is connected to the information appliance via the wireless LAN and behavior of the operation target device is instructed by the information appliance. For example, a print instruction is transmitted from a portable information appliance, such as a smartphone, to a printing machine as the operation target device, to thereby cause the printing machine to carry out print output.

For connecting the information appliance to the operation target device via the wireless LAN, it is necessary to identify the operation target device on the wireless LAN. Usually, when the operation target device, such as a printing machine, is identified and connected, the information appliance stores information of the operation target device of the connection destination. Then, in connection of the next time, the information appliance identifies the operation target device based on the stored information.

SUMMARY

According to an aspect of the present invention, an information processing device includes: a communication controller that is able to connect to plural wireless LANs (Local Area Networks); a setting information management unit that, when connection is made to an operation target device via a wireless LAN, manages setting information including information of a first wireless LAN, which is a wireless LAN as a connection destination, and information of the operation target device; a communication switching unit that, in a case where the operation target device does not exist on a second wireless LAN, which is a wireless LAN currently connected by the communication controller, switches the wireless LAN as the connection destination to the first wireless LAN based on the setting information; and an operation unit that searches for the operation target device on the first wireless LAN to which the communication switching unit has switched the wireless LAN, and if the operation target device exists, connects to the operation target device to operate thereof.

DETAILED DESCRIPTION

Hereinafter, an exemplary embodiment according to the present invention will be described in detail with reference to attached drawings.

<System Configuration>

Figure 1:
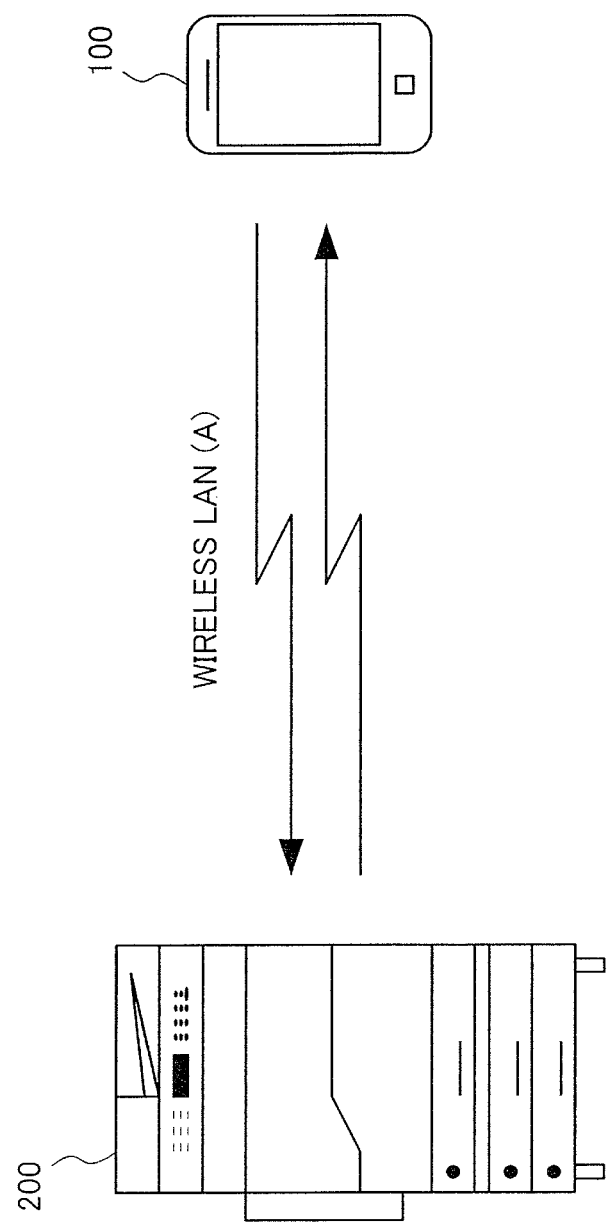
FIG. 1 is a diagram showing an overall configuration example of a network system to which an exemplary embodiment is applied.

FIG. 1 is a diagram showing an overall configuration example of a network system to which the exemplary embodiment is applied.

In the exemplary embodiment, description will be given of a case, in which a print instruction is provided to a printing machine as an operation target device by a portable information terminal, such as a smartphone, via a wireless LAN (Local Area Network), as an example. As shown in FIG. 1, the network system to which the exemplary embodiment is applied includes a portable information terminal 100 as an example of an information processing device and a printing machine 200 as an example of an operation target device. The portable information terminal 100 includes a communication function to connect to the wireless LAN, and thereby able to connect to plural wireless LANs. On the other hand, the printing machine 200 is connected to a wireless LAN (A), which is one of the wireless LANs that can be connected by the portable information terminal 100. Accordingly, the portable information terminal 100 and the printing machine 200 are connected via the wireless LAN (A).

<Functional Configuration of Portable Information Terminal>

Figure 2:
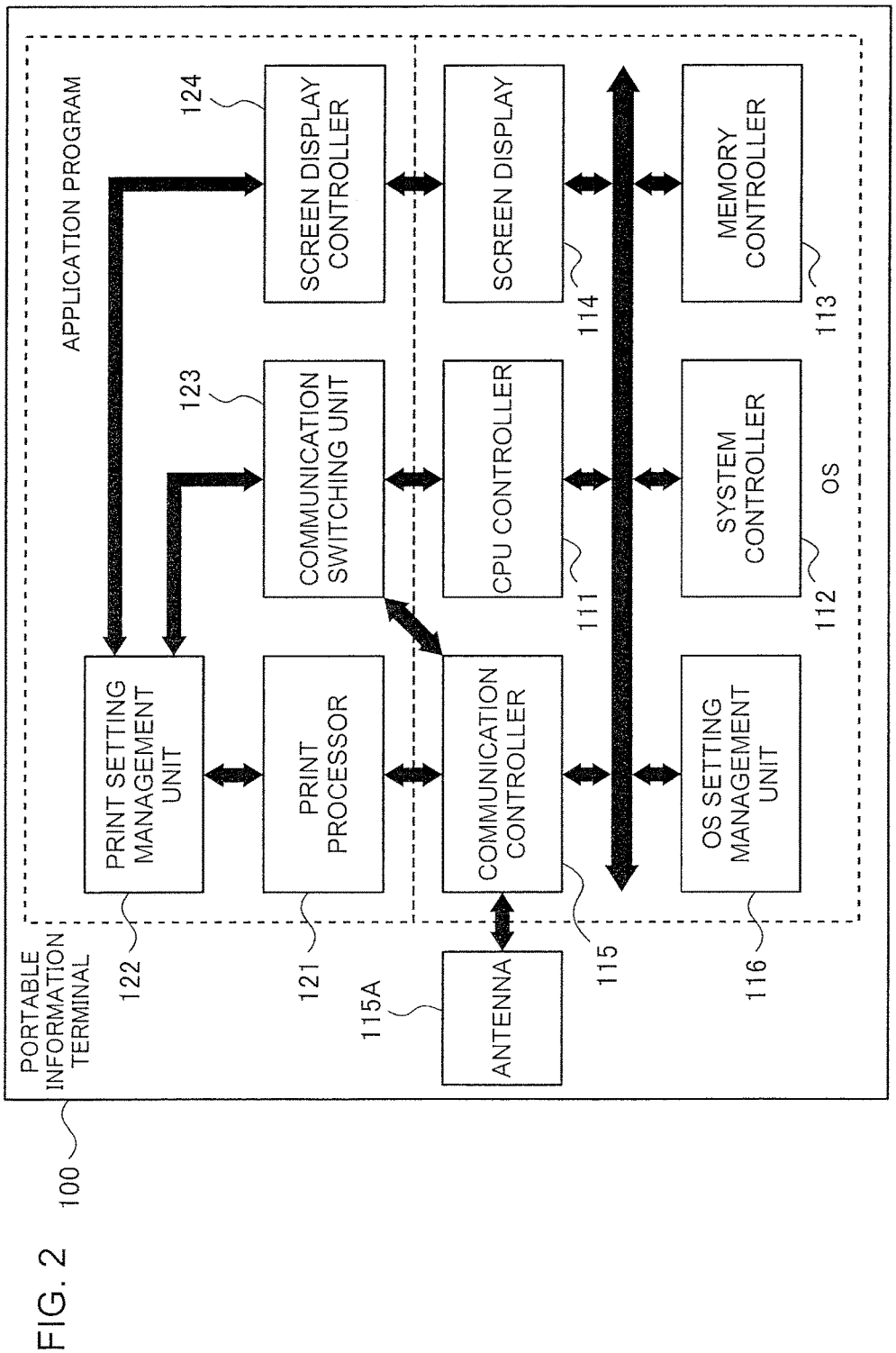
FIG. 2 is a diagram showing a functional configuration of a portable information terminal.

FIG. 2 is a diagram showing a functional configuration of the portable information terminal 100.

As shown in FIG. 2, the portable information terminal 100 is realized, for example, by a computer and includes: a CPU controller 111, a system controller 112; a memory controller 113; a screen display 114; a communication controller 115; and an OS setting management unit 116. These functions are realized, for example, by a CPU (Central Processing Unit), which is a computation device, executing an OS (Operating System). The portable information terminal 100 also includes: a print processor 121; a print setting management unit 122; a communication switching unit 123; and a screen display controller 124. These functions are realized, for example, by a CPU executing an application program for print processing.

The CPU controller 111 controls operations of the CPU, which is a processor in the portable information terminal 100. The system controller 112 controls a bus that connects various kinds of devices mounted on the portable information terminal 100 and the CPU. The memory controller 113 controls data reading and writing from and to a memory, which is a memory in the portable information terminal 100.

The screen display 114 controls a display (such as a liquid crystal display), which is a display in the portable information terminal 100, to thereby display a screen.

The communication controller 115 controls a communication unit of the portable information terminal 100 (in FIG. 2, an antenna 115A as a part of the communication unit is shown), to thereby control connection to the wireless LAN and transmission and reception of data. In the exemplary embodiment, as a wireless LAN to which the portable information terminal 100 is able to be connected (setting for connection is preserved), the wireless LAN (A) is included. Moreover, the communication controller 115 includes a direct connection function for connecting to other appliances in a peer-to-peer way without using the access points (for example, Wi-Fi Direct (trademark) in Wi-Fi (trademark)).

The OS setting management unit 116 manages setting information in the above-described various kinds of functions realized by the OS. For example, the OS setting management unit 116 manages information about setting of brightness or contrast of the screen controlled by the screen display 114, setting of network connection controlled by the communication controller 115, and the like.

The print processor 121 causes the printing machine 200 to carry out the print processing. Specifically, the print processor 121 transmits print setting information and a print order together with print data to the printing machine 200. In more detail, the communication unit is controlled by the function of the communication controller 115 provided by the OS, and thereby, in a state connecting to the printing machine 200 via the wireless LAN (A), the print processor 121 transmits the print order or the like to the printing machine 200 by use of the control function of the communication controller 115. In other words, the print processor 121 functions as an operation unit that operates the printing machine 200, which is the operation target device.

The print setting management unit 122 manages identifying information of the printing machine 200, which is an output destination of a print instruction, and various kinds of setting information in print processing by the print processor 121. Moreover, in the exemplary embodiment, the print setting management unit 122 also manages information about the network in which the printing machine 200 as the output destination of the print instruction exists (here, the wireless LAN (A)). The network information to be the object of management includes, for example, an SSID (Service Set Identifier), a network name and a MAC address (Media Access Control address).

The communication switching unit 123 controls the communication controller 115 to switch a wireless LAN as a connection destination.

The screen display controller 124 creates an interface screen for print processing, and causes the interface screen to be shown on a display by use of the function of the screen display 114 provided by the OS. As the examples of the interface screen include, for example, a setting screen for print setting information and an input screen for the print order. Moreover, the screen display controller 124 creates an image of print data, and causes the print data to be shown on the display by use of the function of the screen display 114.

Moreover, though not particularly shown in the figure, the portable information terminal 100 includes input units such as a touch panel and key buttons. When a command or data is inputted by these input units, the inputted command or data is accepted by the CPU, through the control by the system controller 112, and processed. Moreover, in the portable information terminal 100, the information managed by the OS setting management unit 116 and the information managed by the print setting management unit 122 are stored in a not-shown memory.

<Functional Configuration of Printing Machine>

Figure 3:
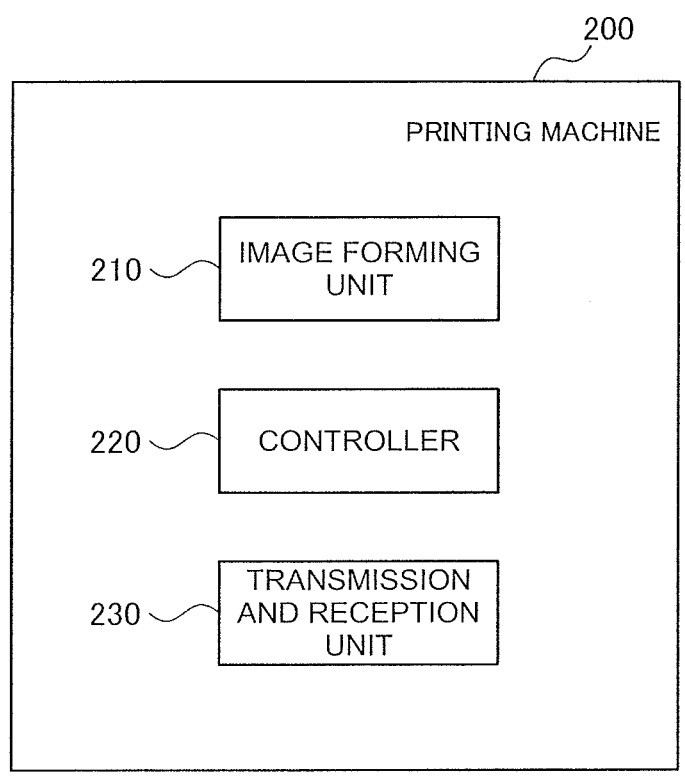
FIG. 3 is a diagram showing a functional configuration of a printing machine.

FIG. 3 is a diagram showing a functional configuration of the printing machine 200.

The printing machine 200 includes: an image forming unit 210; a controller 220; and a transmission and reception unit 230. Based on digital data of an image, the image forming unit 210 forms the image on a medium, such as a sheet, using an image forming material, such as toner. The controller 220 includes, for example, a CPU and a memory that stores programs executed by the CPU, to thereby carry out image processing on the output image or control of each component. Moreover, the controller 220 controls the transmission and reception unit 230 to obtain data of the output image or to accept the print instruction.

The transmission and reception unit 230 includes an interface for connecting to external appliances, and thereby receives print data or commands of print instructions from an external appliance, or transmits information about the printing machine 200 (such as information indicating operating state) in response to a request from an external appliance. Moreover, the transmission and reception unit 230 includes an interface with the wireless LAN, and in the exemplary embodiment, the transmission and reception unit 230 connects to external appliances via the wireless LAN (A). Further, the transmission and reception unit 230 includes a direct connection function for connecting to other appliances in a peer-to-peer way without using the access points. Accordingly, in the exemplary embodiment, the printing machine 200 is connected to the portable information terminal 100 via the wireless LAN (A) or by direct connection using a wireless communication circuit.

<Operations in Printing>

Next, operations in printing by the network system of the exemplary embodiment will be described.

Here, description will be given of the operations in the case where the portable information terminal 100 provides a print instruction to the printing machine 200. As a precondition, connection information with respect to plural wireless LANs including the wireless LAN (A) is stored in the portable information terminal 100, and is managed by the OS setting management unit 116. Moreover, it is assumed that the portable information terminal 100 has been connected to the printing machine 200 via the wireless LAN (A), and accordingly, information of the printing machine 200 is stored in the portable information terminal 100 as information of the connection destination in print setting information (the output destination of print output), and is managed by the print setting management unit 122.

Figure 4:
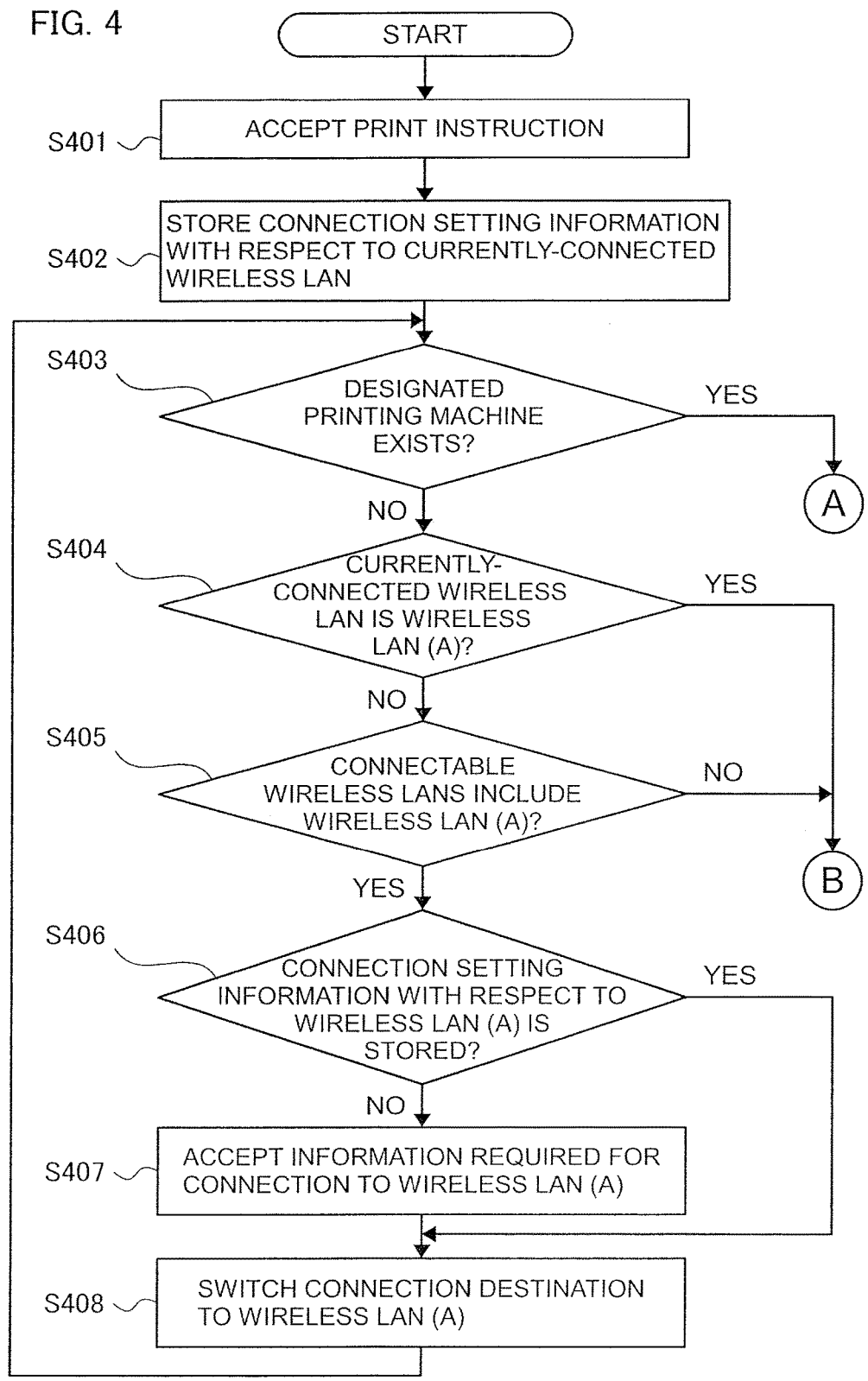
FIG. 4 is a flowchart illustrating operations of the portable information terminal in printing.
Figure 5:
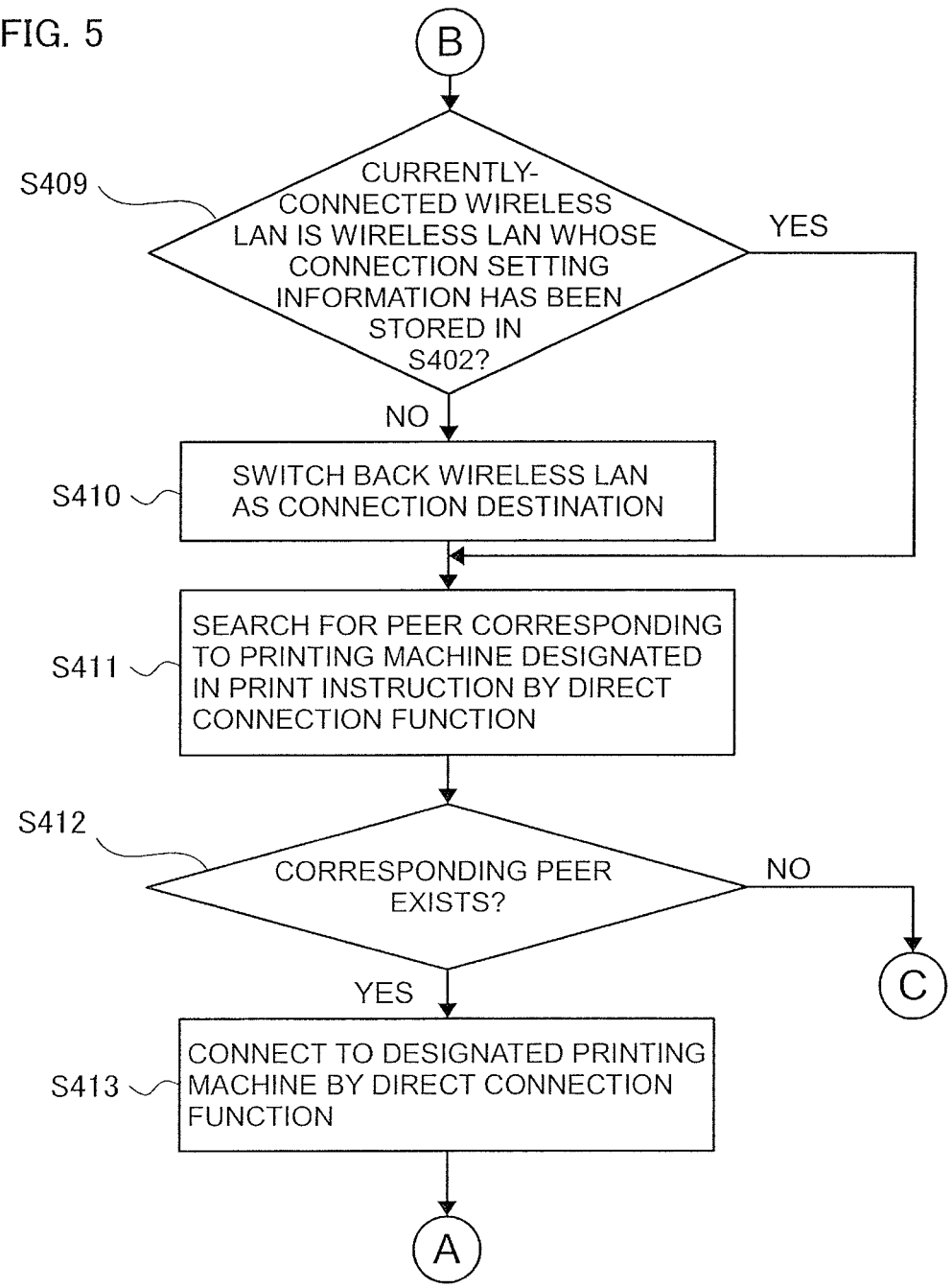
FIG. 5 is another flowchart illustrating operations of the portable information terminal in printing.
Figure 6:
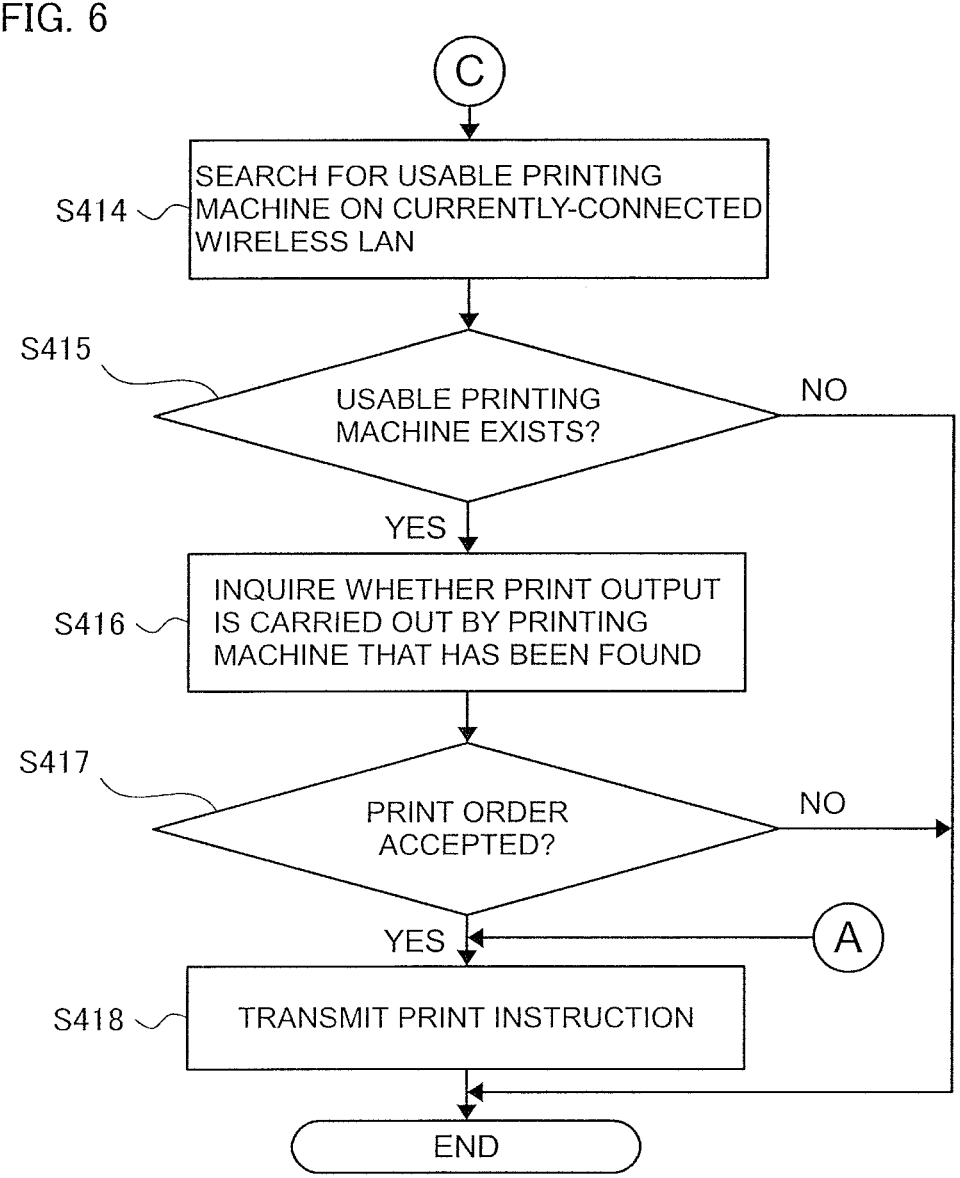
FIG. 6 is another flowchart illustrating operations of the portable information terminal in printing.

FIGS. 4 to 6 are flowcharts illustrating operations of the portable information terminal 100 in printing.

When an operator of the portable information terminal 100 inputs a print instruction by use of the input unit of the portable information terminal 100 and the portable information terminal 100 accepts the inputted print instruction (S401), the portable information terminal 100 stores connection setting information with respect to a currently-connected wireless LAN in the memory (S402). In other words, if the portable information terminal 100 is connected to the wireless LAN (A) at this moment, the connection setting information with respect to the wireless LAN (A) is stored. Moreover, if the portable information terminal 100 is connected to a wireless LAN other than the wireless LAN (A), the connection setting information with respect to the connected wireless LAN is stored. The stored connection setting information is managed by the OS setting management unit 116.

Next, the print processor 121 of the portable information terminal 100 determines whether or not the printing machine 200, which is designated as the output destination in the print instruction provided in S401, exists on the currently-connected wireless LAN via the communication controller 115 (S403). If the printing machine 200, which is the output destination, exists on the currently-connected wireless LAN (YES in S403), the print processor 121 transmits the print instruction to the printing machine 200 via the communication controller 115, and the process is finished (S418). Consequently, the print output is carried out in the printing machine 200 based on the print instruction received from the portable information terminal 100. Note that, here, it is only necessary to establish connection to the printing machine 200 designated as the output destination, and therefore, whether or not the currently-connected wireless LAN is the wireless LAN (A) used to be connected to the printing machine 200 in the past is not considered. In other words, in the case where the printing machine 200 can be connected to a wireless LAN (B), too, other than the wireless LAN (A), the portable information terminal 100 is able to be connected to the printing machine 200 even if the portable information terminal 100 is connected to the wireless LAN (B).

On the other hand, in the case where the printing machine 200 as the output destination does not exist on the currently-connected wireless LAN (NO in S403), next, based on the information managed by the print setting management unit 122, the print processor 121 identifies the wireless LAN (A) that has been used for connection to the printing machine 200 in the past. Then, it is determined whether or not the wireless LAN (A) and the currently-connected wireless LAN are the same (S404).

In the case where the currently-connected wireless LAN is not the wireless LAN (A) (NO in S404), next, the print processor 121 checks whether or not the wireless LAN (A) is included in the currently-connectable wireless LANs by searching the SSID or the like (S405). Then, if it is possible to connect to the wireless LAN (A) (YES in S405), next, the print processor 121 makes an inquiry of the OS setting management unit 116 whether or not connection setting information with respect to the wireless LAN (A) is stored (S406).

In the case where the connection setting information with respect to the wireless LAN (A) is stored (YES in S406), next, the communication switching unit 123 controls the communication controller 115 to switch the wireless LAN as the connection destination to the wireless LAN (A) (S408). On the other hand, in the case where the connection setting information with respect to the wireless LAN (A) is not stored (NO in S406), the screen display controller 124 controls the screen display 114 to cause the input screen for connection setting to be shown on the display. Based on this input screen, the operator operates the input unit and inputs information required to connect to the wireless LAN (A), such as a password. The communication controller 115 of the portable information terminal 100 accepts input of the information (S407), and switches the wireless LAN as the connection destination to the wireless LAN (A) based on the inputted information (S408). After connection to the wireless LAN (A) is established as described above, the print processor 121 returns to S403 and determines once again whether or not the printing machine 200 exists on the currently-connected wireless LAN.

In the case where the print processor 121 determines that the currently-connected wireless LAN is the wireless LAN (A) in S404 (YES in S404), it becomes impossible to connect to the printing machine 200 despite that the wireless LAN (A) is currently connected. Moreover, in the case where the print processor 121 determines that the wireless LAN (A) is not included in the currently-connectable wireless LANs in S405 (NO in S405), it becomes impossible to connect to the wireless LAN (A) on which the printing machine 200 exists. Accordingly, in such cases, the portable information terminal 100 makes an attempt to establish direct connection in a peer-to-peer way.

First, the print processor 121 determines whether or not the currently-connected wireless LAN is the wireless LAN whose connection setting information has been stored in S402 (S409). Specifically, for example, if an initially-connected wireless LAN is a wireless LAN other than the wireless LAN (A) and a process of switching the connection destination in S408 has been carried out, the currently-connected wireless LAN is the wireless LAN (A). Consequently, the currently-connected wireless LAN is different from the wireless LAN whose connection setting information has been stored in S402.

In the case where the currently-connected wireless LAN is not the wireless LAN whose connection setting information has been stored in S402 (NO in S409), the communication switching unit 123 controls the communication controller 115 to switch back the wireless LAN as the connection destination to the wireless LAN whose connection setting information has been stored in S402 (S410). Then, the print processor 121 searches for a peer corresponding to the printing machine 200 on the wireless LAN by the direct connection function of the communication controller 115 (that is, by operating in an operation mode of direct connection) (S411). Specifically, for example, the print processor 121 obtains the MAC address of the printing machine 200 managed by the print setting management unit 122, and then searches for a peer having the same MAC address as the printing machine 200. On the other hand, in the case where the currently-connected wireless LAN is the wireless LAN whose connection setting information has been stored in S402 (YES in S409), switching of the connection destination by the communication switching unit 123 is not carried out, and the print processor 121 searches for a peer corresponding to the printing machine 200 on the wireless LAN by the direct connection function of the communication controller 115 (S411).

In the case where a peer corresponding to the printing machine 200 is found (YES in S412), the print processor 121 connects to the printing machine 200 by the direct connection function (S413). Then, the print processor 121 transmits the print instruction to the printing machine 200 via the communication controller 115, and the process is finished (S418).

On the other hand, in the case where a peer corresponding to the printing machine 200 is not found (NO in S412), next, the print processor 121 searches for a printing machine, which can be used by the portable information terminal 100 on the currently-connected network (S414). The printing machine that can be used by the portable information terminal 100 is an alternative device for the printing machine 200, which is the operation target device. Here, the printing machine that can be used by the portable information terminal 100 refers to, for example, a printing machine that has been used by the portable information terminal 100 as a print output destination and whose connection destination (print output destination) information is managed by the print setting management unit 122.

In the case where there is no printing machine that can be used by the portable information terminal 100 (NO in S415), the print processor 121 finishes the print processing. At this time, it may be possible that the screen display controller 124 controls the screen display 114 to show a message to the effect that printing is impossible on the display.

In the case where there is any printing machine that can be used by the portable information terminal 100 (YES in S415), the screen display controller 124 controls the screen display 114 to show a screen on the display for inquiring whether or not print output is to be carried out by the printing machine having been found (S416). Based on the inquiring screen, the operator inputs a print order or a termination order. If the print order is inputted, the print processor 121 accepts the print order as a connection instruction (YES in S417), and connects to the printing machine found in searching in S414 to thereby transmit the print instruction, and then the process is finished (S418). On the other hand, in the case where the input of the termination order is accepted (NO in S417), the print processor 121 does not transmit the print instruction and the process is finished.

The exemplary embodiment has been described in the above; however, specific modes of the present invention are not limited to the above-described exemplary embodiment. For example, in the above-described exemplary embodiment, it is assumed that the printing machine 200 includes the interface for the wireless LAN, and connects to the external appliances via the wireless LAN; however, the printing machine 200 may be connected to a router or the like having an access point function via a cable. Moreover, the printing machine 200 may be a multifunction device including a facsimile function or an image reading function in addition to the image forming function. Moreover, in the above-described exemplary embodiment, description is given by taking a case, in which the operation target device is the printing machine 200, and the operation for print output (print instruction) is carried out by the portable information terminal 100, as an example; however, the exemplary embodiment can be applied to various kinds of operation target devices as a system carrying out operations via the wireless LAN. In addition, the information processing device for operating the operation target device is only necessary to be an information processing device connectable to the operation target device via the wireless LAN, and is not limited to the portable information terminal 100. Alternatively, various kinds of exemplary embodiments or modifications without departing from the technical idea of the present invention are included in the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    at least one hardware processor configured to implement:
        a communication controller configured to connect to a plurality of wireless LANs (Local Area Networks);
        a setting information management unit that, in response to a connection being made to an operation target device via a first wireless LAN of the plurality of wireless LANs, manages setting information comprising a connection destination of the first wireless LAN and information of the operation target device;
        a communication switching unit that, in response to determining, by searching a second wireless LAN for the operation target device, that the operation target device is not connected to the second wireless LAN, of the plurality of wireless LANs, currently connected to by the communication controller, determines whether to switch to the first wireless LAN; and
        an operation unit that searches, in a case in which the communication switching unit switches from the second wireless LAN to the first wireless LAN, for the operation target device on the first wireless LAN, and if the operation target device is found, connects to the operation target device.

2. The information processing device according to claim 1, wherein,
    in a case in which the operation target device is not found on the first wireless LAN to which the communication switching unit has switched, the communication switching unit switches back to the second wireless LAN, and
    the operation unit searches for the operation target device on the second wireless LAN in an operation mode by a direct connection without any wireless LAN relay station, and if the operation target device is detected, connects to the operation target device.

3. The information processing device according to claim 2, wherein, in a case where the operation target device is not detected in the operation mode, the operation unit searches for an alternative device on the second wireless LAN, and if the alternative device is detected, inquires whether to connect to the alternative device, and in a case in which a connection instruction to the alternative device is accepted through an input by an operator, connects to the alternative device.

4. The information processing device according to claim 1, wherein, in a case in which the first wireless LAN and the second wireless LAN are a same wireless LAN, the operation unit searches for the operation target device in an operation mode by a direct connection without any wireless LAN relay station, and if the operation target device is detected, connects to the operation target device.

5. The information processing device according to claim 4, wherein, in a case in which the operation target device is not detected in the operation mode, the operation unit searches for an alternative device on the second wireless LAN, and if a the alternative device is detected, inquires whether to connect to the alternative device, and in a case in which a connection instruction to the alternative device is accepted through an input by an operator, connects to the alternative device.

6. The information processing device according to claim 1, the communication switching unit, in response to determining that the operation target device is not found on the second wireless LAN, determines whether to switch to the first wireless LAN by determining whether the second wireless LAN is the first wireless LAN.

7. The information processing device according to claim 1, wherein the communication controller, in response to a determination that the operation target device is found on the second wireless LAN other than the first wireless LAN, connects to the operation target device on the second wireless LAN.

8. The information processing device according to claim 1, wherein, in the case in which the communication switching unit switches from the second wireless LAN to the first wireless LAN, the operation unit searches for the operation target device in an operation mode by a direct peer-to-peer LAN connection, without any wireless LAN relay station, to the operation target device by searching for a peer having a MAC address as indicated by the setting information regarding the operation target device.

9. The information processing device according to claim 1, wherein the at least one hardware processor is further configured to implement:
   determining, in a case in which the communication controller is connected to the second wireless LAN and in response to determining that the operation target is connected to the second LAN by searching the second wireless LAN for the operation target device, to maintain a connection to the second LAN and to connect to the operation target.

10. A connection controlling method comprising:
   in response to a connection being made to an operation target device via a first wireless LAN, managing setting information comprising a connection destination of the first wireless LAN and information of the operation target device;
   searching for the operation target device via a second wireless LAN;
   in response to determining, by searching the second wireless LAN for the operation target device, that the operation target device is not connected to the second wireless LAN, determining whether to switch to the first wireless LAN; and
   searching for the operation target device on the first wireless LAN after switching to the first wireless LAN, and if the operation target device is found, connecting to the operation target device.

11. The connection controlling method according to claim 10, wherein, in a case in which the operation target device is not found on the first wireless LAN, switching back to the second wireless LAN and searching for the operation target device on the second wireless LAN in an operation mode by a direct connection without any wireless LAN relay station, and if the operation target device is detected, connecting to the operation target device.

12. A non-transitory computer readable medium storing a program configured to cause a computer to execute a process comprising:
   in response to a connection being made to an operation target device via a first wireless LAN, managing setting information comprising a connection destination of the first wireless LAN and information of the operation target device;
   searching for the operation target device via a second wireless LAN;
   in response to determining, by searching the second wireless LAN for the operation target device, that the operation target device is not connected to the second wireless LAN, determining whether to switch to the first wireless LAN; and
   searching for the operation target device on the first wireless LAN after switching, and if the operation target device is found, connecting to the operation target device.

13. The non-transitory computer readable medium storing a program according to claim 12, wherein, in a case in which the operation target device is not found on the first wireless LAN, switching back to the second wireless LAN, and searching for the operation target device on the second wireless LAN in an operation mode by a direct connection without any wireless LAN relay station, and if the operation target device is detected, connecting to the operation target device.

* * * * *